United States Patent [19]

Yoshida et al.

[11] 3,922,326

[45] Nov. 25, 1975

[54] APPARATUS FOR TREATING LIQUIDS AND GASES

[75] Inventors: Fujio Yoshida; Akiharu Yamada; Shogo Tanigawa; Takesi Yokoyama, all of Tamano, Japan

[73] Assignee: Mitsui Shipbuilding and Engineering Co., Ltd., Tokyo, Japan

[22] Filed: Nov. 26, 1974

[21] Appl. No.: 527,439

[30] Foreign Application Priority Data
Nov. 29, 1973  Japan.............................. 48-134194

[52] U.S. Cl............. 261/113; 261/114 R; 202/158
[51] Int. Cl.². B01D 3/14; B01D 47/00; C10J 1/08; F02M 29/04
[58] Field of Search......... 261/114 R, 113; 202/158, 202/159; 159/18, 13 A

[56] References Cited
UNITED STATES PATENTS

| | | | |
|---|---|---|---|
| 2,051,545 | 8/1936 | Collins | 202/158 |
| 2,566,732 | 9/1951 | Krieg | 261/114 R |
| 2,711,308 | 6/1955 | Cogan | 261/113 |
| 2,804,427 | 8/1957 | Suriano | 261/114 R |
| 3,075,752 | 1/1963 | Leva | 261/113 |
| 3,410,540 | 11/1968 | Bruckert | 261/113 |
| 3,488,037 | 1/1970 | Prochazka et al. | 261/113 |
| 3,556,736 | 1/1971 | Boyd | 261/114 R |

*Primary Examiner*—Tim R. Miles
*Assistant Examiner*—Gregory N. Clements
*Attorney, Agent, or Firm*—Dorfman, Herrell and Skillman

[57] ABSTRACT

Apparatus for treating liquids and gases provided with vertically spaced trays each of which have apertures therein and a gas-liquid contact structure surrounding said aperture, wherein gas is fed to the uppermost space through the structure and liquid is fed onto the uppermost tray.

3 Claims, 4 Drawing Figures

APPARATUS FOR TREATING LIQUIDS AND GASES

This invention relates to an apparatus for treating liquids and gases, and more particularly to an apparatus for contacting high temperature gas with liquid for cooling or absorbing the gas, or separating dusts in chemical industries.

In the conventional gas-liquid contacting apparatus, gas is introduced from the lower portion of the column of the apparatus and liquid is fed into the column from the upper portion thereof, and the gas and liquid flow in a counter-current manner. There is no great disadvantage in this apparatus, if temperature of the gas to be introduced is low. However, if the temperature of the gas is as high as 300°–900°C., various disadvantages are brought about by corrosion. More specifically, when operation of this apparatus is terminated and gas is stopped, the liquid on the bottom of the column to wet the floor and walls of the lowermost stage of the column.

When operation is started again the wet surface of the lower most stage is heated by the high temperature gas to be dried. Thus, the floor and walls of the lowermost stage is repeatedly wetted with the liquid and dried by the high temperature gas. During this wetting and drying operation, corrosive components absorbed in the liquid are condensed and thereby the surface of the lowermost stage is corroded.

It is therefore a primary object of this invention to provide an apparatus which can overcome the foregoing defects of the conventional apparatus. The apparatus according to this invention is characterized in that a high temperature gas is introduced from the column top, the liquid is maintained on the tray of all stages of the column even if the operation is terminated, and the liquid-immersed portions are made of an anti-corrosive material.

The apparatus of this invention is suitable for treating high temperature gases containing poisonous components and dusts which are discharged from boilers, large-size diesel engines, heating furnaces, incinerators, and the like.

This invention will now be described with reference to the accompanying drawings, in which.

Figure 1:
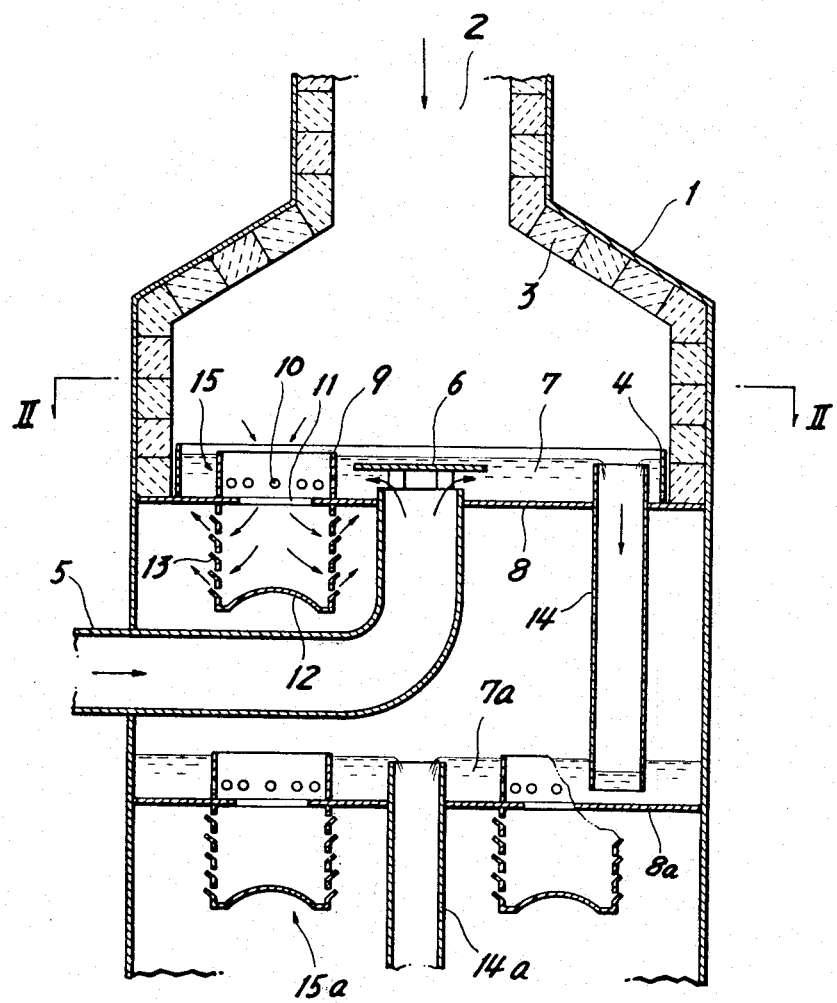
FIG. 1 is a sectional view of the apparatus according to this invention taken along the line I — I of FIG. 2.
Figure 2:
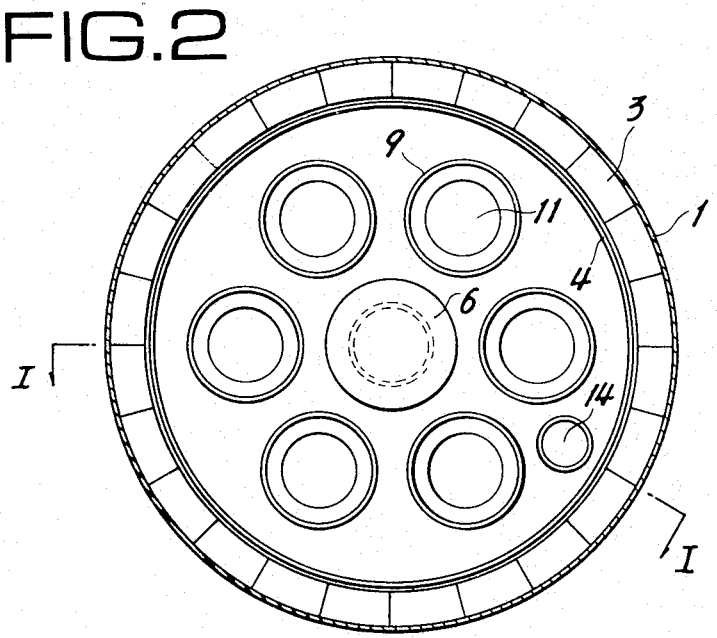
FIG. 2 is a sectional view, taken along the line II — II of FIG. 1.

Referring to FIGS. 1 and 2, a column 1 comprises a vertical cylindrical body and has a high temperature gas inlet 2 at the top thereof. The interior of the column 1 is divided by a series of trays 8 and 8a mounted in vertically spaced relation. The inner wall of the space above the uppermost stage tray 8 is lined with heat-resistant and acid-resistant bricks 3, because the wall is subjected to high temperature gas. A liquid feed conduit 5 is provided to feed a liquid into the column from the outside without penetrating through the bricks 3 and is opened in the space of the uppermost stage, so that the liquid is fed on the uppermost tray 8. A baffle 6 is mounted on the top of the conduit 5 to deflect the liquid flow in the horizontal direction to prevent waving of the liquid by the introduced liquid. A downcomer 14 is mounted downwardly in the tray 8 to cause the overflown liquid to flow down to the tray 8a of the lower stage. The depth of the liquid 7 is determined by high of the downcomer 14. The brick 3 is separated from the liquid 7 on the tray 8 by means of a partition 4 welded to the tray 8, and this partition 4 is made up of a high-quality anti-corrosive material.

A plurality of gas-liquid contacting structures 15 are disposed on the tray 8. Each gas-liquid contacting structure surrounds an opening 11 of the tray 8 and comprises a cylindrical weir 9 on the upper surface of the tray and a contacting cylinder 12 having a bottom which is provided on the underside of the tray. The weir 9 has a height corresponding substantially to the height of the liquid 7 and a number of small apertures 10. A contacting cylinder 12 has a number of horizontally elongated apertures each of which is provided with an upwardly deflected louver 13 at the lower edge thereof. The tray 8a of the lower stage has similarly a downcomer 14a and a number of gas-liquid contacting structures 15a and it is constructed so that the liquid 7a is maintained on the tray 8a. Other trays of further lower stages have the same structure as the tray 8a.

High temperature gas is introduced from the high temperature gas inlet 2 disposed at the top of the column 1, and it flows downwardly in the interior of the column 1. Liquid 7 is fed onto the tray 8 through the liquid feed conduit 5 by means of a pump disposed outside the column. Since the baffle 6 is mounted on the introduction opening, no large waves are formed on the surface of the liquid 7. The liquid is maintained at a level, for example, 50 to 100 mm determined by the height of the downcomer 14.

While the high temperature gas is passed downwardly through openings 11 of gas-liquid contacting structures 15 mounted on the tray 8, the speed of the gas is increased to about 8 to 20 m/sec. when passing through the opening 11. The gas shears the liquid in the structures 15 which is introduced through apertures 10 of the weir 9 so that the high temperature gas carries the liquid in the form of mist. The mist flows into the contacting cylinders 12 and impinges against the inner walls thereof so that the flowing direction is changed. As a result, gas-liquid separation, shearing of the liquid by the gas and gas-liquid combination are repeated. Then, the gas is exhausted to the space of the lower stage of the column from elongated apertures of the contacting cylinder 12. At this moment, a considerable amount of the mist is blown to the underside of the tray 8 to wet the metal surface, so that the liquid film is formed on the underside of the tray and flown down on the lower tray 8a, whereby local concentration of corrosive components is prevented. Further the wet surface of the tray acts to catch the dust contained in the gas to perform dust separation.

The liquid 7a on the tray 8a is operated in the same manner as described. The high temperature gas is cooled by evaporation of the liquid when passed through the gas-liquid contacting structures, and poisonous components and dusts in the gas are separated by the liquid.

Figure 3:
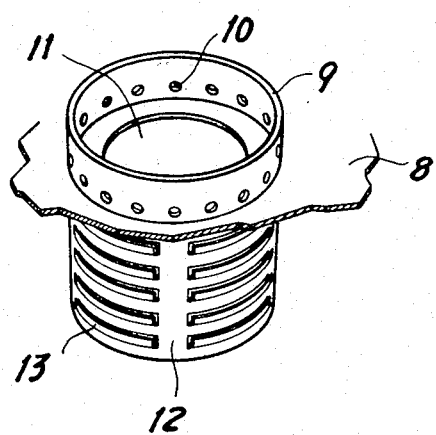
FIG. 3 is a perspective view showing the gas-liquid contacting structure.
Figure 4:
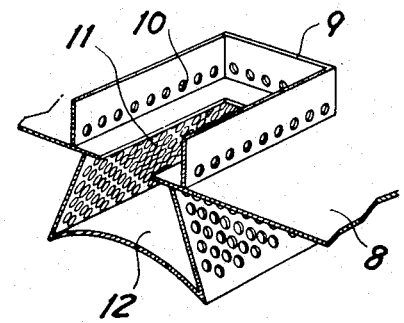
FIG. 4 is a perspective view showing a part of example of the gas-liquid contacting structure.

The gas-liquid contacting structure 15 is not limited to one shown in FIG. 3, but other structures can optionally be used. For example, a structure as shown in FIG. 4 may be applied. The opening 11 of the embodiment has a rectangular shape and the contacting cylinder 12 is frustum shape. Further, the contacting cylinder 12 has a plurality of small round apertures.

The height of the weir plate 9 is such that it exceeds a little over the liquid level and the liquid is allowed to go beyond this weir plate when small waves are formed on the liquid surface. By this arrangement, it is possible to prevent corrosion of the top end portion of the weir plate 9 by the high temperature gas.

In case highly corrosive conditions are apprehended, it is preferred that the partition 4 is arranged to have a water jacket structure so that it may be cooled by the water.

As is apparent from the foregoing description, in the apparatus of this invention, the pressure loss is minimized and the operation can be accomplished at a high efficiency without formation of a corrosive environment when the operation is stopped.

What is claimed is:

1. Apparatus for treating liquids and gases comprising a column having a gas inlet at the top thereof and trays provided at spaced intervals, each tray being provided with a downcomer for maintaining a depth of liquid thereon and overflowing the liquid to the lower tray, openings communicating with the space below the tray, gas-liquid contacting structures surrounding said opening, each gas-liquid contacting structure comprising a perforated weir plate provided above the tray and a contacting cylinder having a bottom and a plurality of apertures at the side wall provided below the tray, and means for feeding the liquid onto the uppermost tray.

2. Apparatus for treating liquids and gases in accordance with claim 1 wherein said contacting cylinder has a plurality of apertures with upwardly directed louvers.

3. Apparatus for treating liquids and gases in accordance with claim 1 wherein the uppermost space wall in said column being lined with heat-resistant bricks.

* * * * *